United States Patent [19]

Inoue

[11] Patent Number: 4,725,706
[45] Date of Patent: Feb. 16, 1988

[54] TW-ELECTROEROSION UTILIZING CYCLICALLY REDUCED CUTTING FEED RATE

[75] Inventor: Kiyoshi Inoue, Tokyo, Japan

[73] Assignee: Inoue Japax Research Incorporated, Japan

[21] Appl. No.: 791,097

[22] Filed: Oct. 24, 1985

[30] Foreign Application Priority Data

Oct. 25, 1984 [JP] Japan .................. 59-222871

[51] Int. Cl.⁴ ............................... B23H 7/06
[52] U.S. Cl. ............................. 219/69 M; 219/69 M; 219/69 W
[58] Field of Search ............. 219/69 W, 69 C, 69 M; 204/224 M, 206

[56] References Cited

U.S. PATENT DOCUMENTS

| 4,324,970 | 4/1982 | Nanasawa et al. | 219/69 W |
|---|---|---|---|
| 4,518,842 | 5/1985 | Obara | 219/69 W |
| 4,521,662 | 6/1985 | Kinoshita et al. | 219/69 W |
| 4,523,073 | 6/1985 | Gamo et al. | 219/69 W |
| 4,581,513 | 4/1986 | Obara et al. | 219/69 W |

FOREIGN PATENT DOCUMENTS

| 28926 | 5/1981 | European Pat. Off. | 219/69 C |
|---|---|---|---|
| 68029 | 5/1983 | European Pat. Off. | |
| 3021669 | 1/1981 | Fed. Rep. of Germany. | |
| 3131056 | 3/1982 | Fed. Rep. of Germany. | |
| 3203605 | 9/1982 | Fed. Rep. of Germany. | |
| 3230074 | 3/1983 | Fed. Rep. of Germany. | |
| 3405424 | 8/1984 | Fed. Rep. of Germany. | |
| 54-39297 | 3/1979 | Japan | 219/68 |
| 57-66827 | 4/1982 | Japan | 219/69 M |
| 114330 | 7/1982 | Japan | 219/69 M |
| 144626 | 9/1982 | Japan | 219/69 C |
| 120428 | 7/1983 | Japan | 219/69 C |
| 171220 | 10/1983 | Japan | 219/69 M |
| 59-93237 | 5/1984 | Japan | 219/69 C |
| WO82/02164 | 7/1982 | PCT Int'l Appl. | 219/69 W |

Primary Examiner—J. R. Scott
Assistant Examiner—Geoffrey S. Evans
Attorney, Agent, or Firm—Finnegan, Henderson, Farabow, Garrett & Dunner

[57] ABSTRACT

A traveling-wire electroerosion method and apparatus in which the cutting feed rate is cyclically increased and decreased in a prescribed manner. In a first step of the method, the cutting feed is effected along one portion of a commanded feed path at a maximum rate by a certain first extent such that the traveling wire span between the guide members bends backwards, thus deviating beyond a certain degree from the straight-line path established between the guide members. In a second step, the cutting feed is effected along another portion of the feed path immediately following that one portion at a minimum rate and by a certain small extent such that the bent traveling wire span comes into alignment with the straight-line wire travel path. A control unit is provided which operates a numerical controller to repeat the two-step cycle and may be operable also to act on a flushing medium supply unit, a wire-tension unit and a power supply unit to minimize the rate-reduced time period or distance of feed while maintaining the width of the cut slot or kerf materially unvaried throughout the process.

13 Claims, 8 Drawing Figures

TW-ELECTROEROSION UTILIZING CYCLICALLY REDUCED CUTTING FEED RATE

FIELD OF THE INVENTION

The present invention relates to traveling-wire electroerosion and, more particularly, to a method of and apparatus for electroerosively cutting an electrically conductive workpiece by means of a continuous, wire or like-form flexible electrode in which the cutting feed rate is cyclically reduced to overcome problems which arise due to the flexing of the flexible electrode.

BACKGROUND OF THE INVENTION

Traveling-wire electroerosion is a machining process which makes use of a thin, flexible, elongate, conductive element such as wire as the tool electrode for electroerosion of a conductive workpiece. Such an element in the process typically is 0.05 to 0.5 mm in thickness or diameter and is hereinafter referred to as "wire electrode" or "electrode wire" as commonly called in the art. The wire electrode is axially transported generally continuously from a supply means to a takeup means through a cutting zone in which the workpiece is disposed. The cutting zone is defined between a pair of guide members which support and hold the electrode wire while traveling through the workpiece. Wire traction and braking means allows the continuous wire to be stretched and generally taut under a given tension and to be axially driven between the guide members while traversing the workpiece, thus presenting a continuously renewed electrode surface juxtaposed in electroerosive cutting relationship with the workpiece across a narrow cutting gap. The cutting gap is flushed with a fluid medium and is electrically energized with a high-current density electrical machining current which is passed between the electrode wire and the workpiece to erode the latter, thus erosively removing material therefrom.

The cutting process may be performed in any of various electroerosive machining modes. In electrical discharge machining (EDM), the fluid medium is a dielectric liquid, e.g. deionized water, and the machining electric current is supplied in the form of a succession of electrical pulses. In electrochemical machining (ECM), the fluid medium is a liquid electrolyte, e.g. an aqueous electrolytic solution and the machining current is a high-amperage continuous or pulsed current. In electrochemical-discharge machining (ECDM), the fluid medium has both electrolytic and dielectric natures for the machining actions and the machining current is preferably supplied in the form of pulses which facilitate the production of electrical discharges through the conductive liquid medium.

The workpiece may be disposed in a bath of the liquid medium to immerse the cutting region therein. More typically, however, the cutting zone is disposed in the air environment. Advantageously, one or two nozzles are disposed at one or both sides of the workpiece to deliver the flushing medium along the electrode wire into the cutting zone disposed in the air environment or immersed in the generally static mass of the liquid medium. The cutting liquid medium is conveniently water as mentioned or an aqueous solution, which is deionized or ionized to a varying extent to serve as the desired particular electroerosive cutting medium.

To advance electroerosive material removal in the workpiece, the latter is typically displaced relative to the traveling wire and transverse thereto. This allows the traveling wire to advance translationally in the workpiece and consequently a narrow cutting slot is progressively formed behind the advancing wire, the slot having a width slightly greater than the wire thickness. The continuous relative displacement along a programmed path results in the formation of a cut contour corresponding to such a path and defined by this cutting slot in the workpiece.

Higher cutting speed in the process described is an ever increasing demand in the industry and is desirable to achieve with due precision. Thus, in order to achieve a maximum cutting rate defined in terms of volume of stock removed per unit time or, given a wire thickness, area of stock removal per unit time, and thus to minimize the cutting time, the cutting feed rate (i.e. rate of relative displacement between the wire and the workpiece along the programmed path) may be preset at a maximum value and/or servo-controlled, while other cutting parameters are adequately preset and/or in-process controlled, so as to achieve such a maximum value.

As mentioned previously, the guide members at the opposite sides of the workpiece are provided to establish a straight-line path for the span of the wire traveling through the cutting zone and a considerable tension is applied to the traveling wire across these guide members in order to maintain its axis across the cutting zone in alignment with that path. As the cutting feed rate is increased, however, it has been found that the traveling span of thin wire bends or flexes backwards or in the direction opposite to the cutting direction due to an erosion-machining pressure created in the narrow gap. This results in a cutting inaccuracy, i.e. a deviation of the cut shape of contour from the commanded shape, especially where cutting proceeds through an arc or corner. Furthermore, when flexing exceeds a certain limit, the wire may break. This phenomenon or the wire flexing which seriously affects the cutting accuracy is not properly ascertained or overcome by a usual servo system designed to control the cutting feed in response to a gap voltage or current inasmuch as the cutting front of the workpiece remains equally spaced from the bent wire electrode and there is essentially no sensible change from a normal gap voltage or current.

OBJECTS OF THE INVENTION

It is, accordingly, the principal object of the present invention to provide a new and improved traveling-wire electroerosion (TW-E) method which significantly eliminates or obviates a cutting inaccuracy which arises due to the flexing of a traveling electrode wire especially in a high-speed electroerosion cutting operation.

Another objects of the invention is to provide a TW-E apparatus for carrying out the method described.

SUMMARY OF THE INVENTION

In accordance with the present invention, in a first aspect thereof there is provided a method of machining a conductive workpiece in which a flexible, elongate electrode element is axially transported to renew its span stretched under tension between a pair of guide members disposed at opposite sides of the workpiece in a cutting zone supplied with a flushing fluid medium, and electrical machining current is passed between the workpiece and the electrode span traveling through the cutting zone to electroerosively remove stock from the workpiece while a straight-line path established for the traveling electrode span between the guide members is displaced relative to the workpiece along a commanded cutting feed path to form a cut contour corresponding thereto in a workpiece, the method comprising the steps of: (a) effecting the passage of machining current between the workpiece and the traveling electrode span in the cutting zone while effecting the relative displacement between said straight-line path and the workpiece from a given position along one portion of said cutting feed path, at a first rate of feed and by an extent such that said traveling electrode span bends backwards beyond a predetermined degree; (b) continuing the passage of machining current between the workpiece and the traveling electrode span in the cutting zone while effecting the relative displacement between said straight-line path and the workpiece along another portion of said cutting feed path immediately following said one portion at a second rate of feed which is lower than said first rate of feed by a second extent which is less than said first extent such that said bent traveling electrode span comes substantially in alignment with said straight-line path in said cutting zone; and (c) repeating steps (a) and (b) in sequence while said straight-line path and said workpiece are relatively displaced along said commanded feed path.

The invention also provides, in a second aspect thereof, an apparatus for machining a conductive workpiece by means of a flexible, elongate electrode element axially transported to renew its span in a cutting zone, comprising: a pair of guide members disposed at opposite sides of the workpiece for establishing a straight-line path for the electrode span traveling through the cutting zone; fluid delivery means for supplying a flushing medium into said cutting zone; tension means for driving said traveling electrode span between said guide members into alignment with said straight-line path; power supply means for passing machining current between said traveling electrode span and the workpiece across a gap flushed with said medium to electro-erosively remove stock from the workpiece; cutting feed means for relatively displacing said straight-line path and said workpiece along a commanded cutting feed path to form a cut contour corresponding thereto in the workpiece; and control means associated with said feed means for operating it to repeat the steps in succession of: (a) while machining current is passed from said power supply means between the workpiece and said traveling electrode span, effecting the relative displacement between said straight-line path and the workpiece from a given position along one portion of said cutting feed path at such a first rate of feed and by such a first extent that said traveling span bends backwards beyond a predetermined degree and (b) while machining current continues to be passed from said power supply means between the workpiece and the traveling electrode span, effecting the relative displacement between said straight-line path and the workpiece along another portion of said cutting feed path immediately following said one portion at a second rate of feed, which is lower than said first rate, by a second extent, which is less than said first extent, such that said bent traveling electrode span comes into substantial alignment with said straight-line path.

BRIEF DESCRIPTION OF THE DRAWINGS

These and other features of the present invention as well as advantages thereof will become more readily apparent from a reaching of the following description taken with reference to the accompanying drawings in which.

SPECIFIC DESCRIPTION

Figure 1:
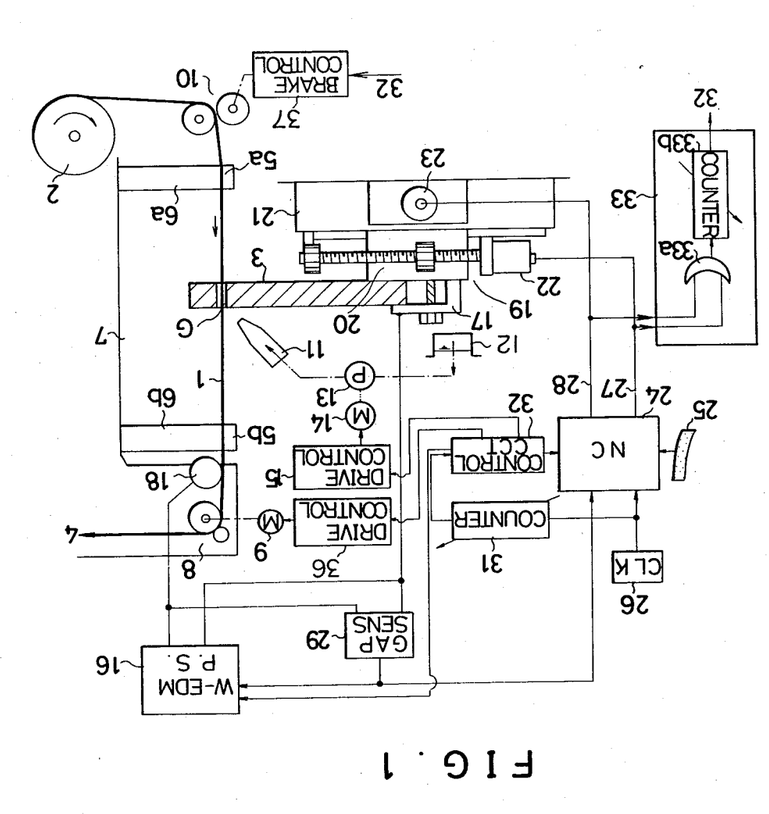
FIG. 1 is a schematic view, partly in section and partly in block form, diagrammatically illustrating a traveling-wire electroerosion system incorporating the principles of the present invention.

In FIG. 1, there is shown a typical traveling-wire electroerosion (TW-E) arrangement in which an electrode wire 1, customarily composed of copper or brass and having a diameter of 0.05 to 0.5 mm, is dispensed from a supply reel 2 to continuously renew its machining span juxtaposed with a conductive workpiece 3 to be cut thereby, the wire being continuously led into a conventional takeup means, not shown but indicated at 4, such as a collection reel or box for disposal. A pair of guide members 5a and 5b are disposed at opposite sides of the workpiece 3 to define a cutting zone between them and establish a straight-line path for the wire so that the wire span in the cutting zone may accurately travel linearly along this path through a working zone of the workpiece. In the arrangement illustrated, the guide members 5a and 5b are provided at end portions of supporting arms 6a and 6b, respectively, which extend horizontally from a vertical machine frame portion 7.

A wire drive roller unit 8 is disposed at the downstream side of the cutting zone (upper side as shown) and rotated by a motor 9 to provide a forward traction for the wire 1 dispensed from the reel. A wire brake unit 10 is also included and disposed at the upstream side of the cutting zone to impart to the wire a traction against the forward traction by the drive roller unit 8 driven. The motor 9 is driven, and the brake unit 10 is actuated, by a drive control circuit 36 and a brake control circuit 37, respectively, which are adjustable individually and in conjunction with each other to establish an adequate rate of travel and tension applied to the wire traveling through the cutting zone between the guide members 5b and 5a.

A pair of nozzles, one of which is shown at 11, are also included to deliver a flushing medium, e.g. deionized water in an EDM mode of operation, into the working zone of the workpiece 3 from both sides thereof. Each or both nozzles 11 are fed with the flushing medium from a reservoir 12 by a pump 13 which is driven by a motor 14. The rate of rotation of the motor 14 is adjustable at a drive control circuit 15 to establish an adequate rate of delivery of the flushing medium towards and into the working zone through the nozzle means 11.

A TW-E power supply 16 has one terminal electrically connected to the workpiece 3 via a conductive clamp 17 and the other terminal electrically connected to the electrode wire 1 via a pair of conductive energizing elements, e.g. a pin or wheel, disposed at opposite sides of the cutting zone in the conventional manner. One of such wire-energizing elements is shown at 18 between the wire guide 18 and the drive roller unit 8. Normally, the workpiece 3 is poled positive and the electrode wire 1 is poled negative. Thus, electrical machining current, typically in the form of pulses, is passed between the traveling wire 1 and the workpiece across a cutting gap G flushed with the liquid medium to electroerosively remove stock from the workpiece 3.

The workpiece 3 is securely mounted by means of the clamp 17 on a compound worktable 19 comprising a X-axis drive table 20 and a Y-axis drive table 21 staggered one upon the other in the conventional cross-feed arrangement. The drive table 20 and 21 are driven by respective motors 22 and 23 in response to command feed signals furnished from a numerical-control (NC) unit 24 to displace the workpiece 3 relative to the traveling cutting span of wire 1 in the cutting zone. Data for a desired cut contour is pre-stored in a record medium 25 and read by the NC unit 24 fed with a uniform stream of clock pulses from a pulse generator 26 so that the clock pulses are distributed into an X-axis feed signal output 27 and a Y-axis feed signal output 28 from the NC unit 24 in accordance with the data read from the record medium 25 and data manually preset in the NC unit 24 which include, inter alia, datum for the diameter of the electrode wire 1. The command feed signals thus issue to the X-axis and Y-axis outputs of the NC unit 24 and are received by the motors 22 and 23 driving the X-axis and Y-axis tables 20 and 21 so that the relative displacement of the traveling wire cutting span to the workpiece in an X-Y plane may follow a commanded feed path to allow the desired cut contour to progressively develop in the workpiece 3. Also included in the data preset in the NC unit 24 are data which determine the rate of cutting feed at a highest or average maximum value that is allowed with a given set of machining parameters selected for a particular cutting operation to be conducted. These parameters include parameters of erosion current, e.g. the pulse duration, interval and peak current of electrical pulses, supplied from the power source 16, the rates of supply of the flushing medium through the nozzles 11 into the cutting gap and the rate of axis travel of the electrode wire 1.

A gap sensing and control circuit 29 is also included to detect short-circuit conditions in the cutting gap G by measuring the voltage that variably develops across the cutting gap and may on the one hand act in a conventional adaptive current control mode on the erosion power supply 16 to one or more of the electrical parameters and on the other hand act in a conventional servo control mode on the NC unit 24 to modify parameters of the cutting feed signals furnished through its outputs 27 and 28 so as to remove such a condition. As soon as a short-circuit condition detected is removed in these manners, the circuit 29 allows the control parameters both to the power supply 16 and the NC unit 24 to be resumed into the values in the normal cutting condition.

Figure 2:
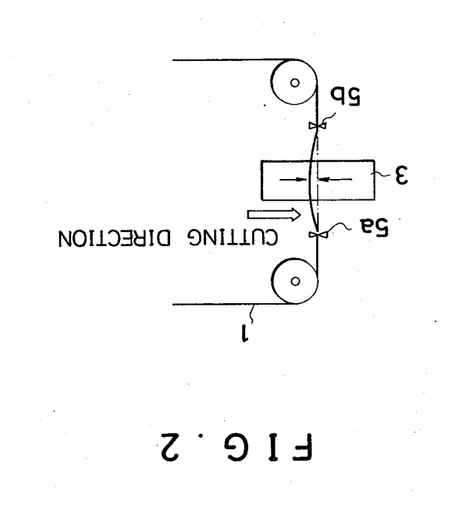
FIG. 2 is a sectional view diagrammatically illustrating development of a pressure tending to deflect an electrode wire in the traveling-wire electroerosion arrangement.
Figure 3:
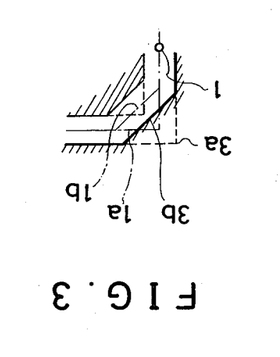
FIG. 3 is a plan view diagrammatically illustrating a deviation of the contour of actual cut from the contour of commanded cut due to the deflection of the electrode wire.

In order to minimize the overall cutting time and thus to maximize the cutting efficiency for a given TW-E operation required to accomplish a desired contour which normally comprises a plurality of successive contour sections, it is desirable that a highest feed rate be set which is permissible by proper setting of other cutting parameters so as to reduce the occurrence of a short-circuit conditions and to enhance the stability of erosion process. This can be achieved, inter alia, by enhancing the gap flushing action and wire travel stability. For such a stabilized cutting condition that can be established, it is possible to adopt a higher peak or mean erosion current and thus to achieve a higher cutting rate. In a TW-E process, however, there is a tendency for the wire 1 to bend backwards or in a direction opposite to the cutting direction as shown in FIG. 2 due, among others, to the pressure created by the erosion action in the narrow cutting gap G. It has been found that this bending or flexing of the cutting span of wire 1 between the guide members $5a$ and $5b$ increases as the erosion current is increased. Thus, in a high-rate erosion process, the effective position of the wire 1 in the workpiece 3 is delayed substantially after the guide position or the established linear path therein so that, for example, at a corner or turning zone the contour of actual cut $3b$ becomes different (i.e. deviating inwardly) from the desired contour of cut $3a$ as shown in FIG. 3 because of such a delay, i.e. a deviation of an actual feed path $1b$ of wire from a commanded feed path $1a$.

FIGS. 4–8 diagrammatically illustrates an improved TW-E method according to the present invention. In FIGS. 4–7, two fluid delivery nozzles as previously described are indicated at $11a$ and $11b$ and may each adopt a conventional configuration that has a nozzle outlet substantially coaxial with the electrode wire 1 and adjacent to the workpiece 3 as shown. Two wire guide members as also previously described are indicated at $5a$ and $5b$ and may be "die guides" disposed in the nozzle $11a$ and $11b$ and substantially coaxial therewith as shown. The wire drive roller unit 8 is shown as disposed downstream of the lower nozzle $5b$ (FIG. 8) and the wire brake roller unit 10 is shown upstream of the upper guide $5a$ (FIGS. 5, 6 and 7) so that the wire 1 travels from up to down (vertically as shown) through the cutting zone in the workpiece 3 in the conventional arrangement here illustrated.

Figures 4, 5:
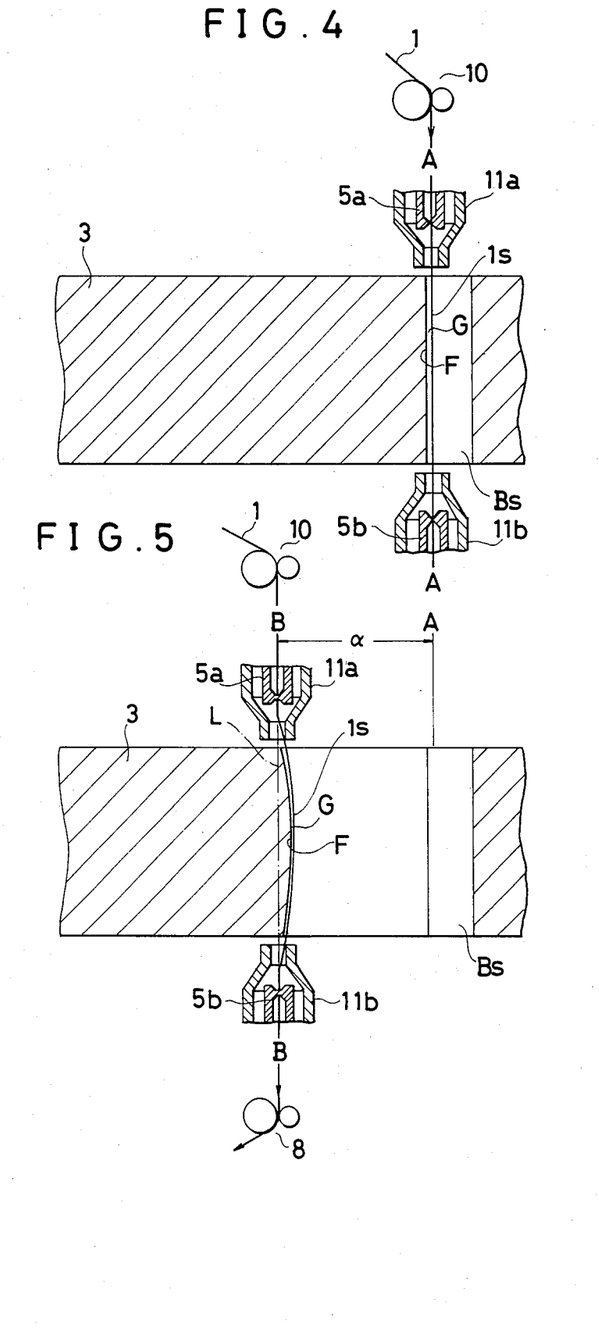
FIGS. 4–7 are sectional views diagrammatically illustrating sequential steps involved in a method according to the present invention.

Referring first to FIG. 4, the electrode wire 1 is shown as traveling in a start bore Bs formed in the workpiece 3 of a given thickness and in alignment with the straight-line (vertical as shown) path established between the guide members $5a$ and $5b$ across the workpiece. An adequate tension Tf on the traveling wire 1 required to this end is applied by the brake roller unit 10 through setting exercised onto the brake control circuit 37 (FIG. 1). The guide members $5a$ and $5b$ are located at a position A relative to the workpiece 3 to position the straight traveling span of wire $1s$ in electroerosion machining relationship with a straight (vertical as shown) wall portion of the start bore Bs.

In the description that follows, let it be assumed that the system operates in an EDM mode.

The EDM gap G established between that wall portion of the start Bs and the traveling span of wire $1s$ is flushed with a dielectric liquid such as deionized water discharged both from the upper and lower nozzles $11a$ and $11b$ while a succession of electrical pulses from the W-EDM power supply 16 (FIG. 1) are applied between the workpiece 3 and the electrode wire 1 to produce discrete, time-spaced electrical discharges across the gap G and thus to initiate EDM stock removal from the workpiece commencing at the start bore Br.

The straight-line path, referred to hereinafter as "L", established between the guide members $5a$ and $5b$, is programmed to move from the start bore Br under feed command signals from the NC unit along a prescribed path, referred to hereinafter as "feed path S", relative to the workpiece 3 to form a desired contour of cut therein. The relative displacement to be effected in this course between the straight-line path L and the workpiece 3 will be referred to as "cutting feed" or "cutting feed displacement" hereinafter.

In a first step (a) of the method according to the invention being described, the cutting feed displacement is effected from a given position A such as shown in FIG. 4 at a given maximum rate or velocity Vf to a predetermined extent $\alpha$, which can be defined in either distance or time period, sufficient to allow the traveling cutting span of wire 1s to become bent and deviated from the straight-line path L as shown in FIG. 5. The position of the straight-line path L relative to the workpiece 3 is designated as B. At the start of this step (a) when the straight-line path L lies at a given position A, the cutting front F is straight and parallel to the straight-line path L.

As erosion cutting proceeds in the step (a) by permitting machining pulses to be consecutively applied between the workpiece 3 and the electrode wire 1 and the cutting feed to continue at the constant or average rate or velocity Vf, the traveling wire span 1s between the guide members 5a and 5b progressively bends or flexes, thus rendering the cut front F correspondingly convexed. In step (a), the rate of flow or pressure of the flushing medium from the nozzles 11a and 11b may be set at a maximum value Pf by setting through the drive control circuit 15 for the motor 14 actuating the liquid supply pump 13 (FIG. 1) while the tension on the traveling wire 1 may be set at a moderate value Tf as previously described. In conjunction with the rate of flow or pressure of the flushing medium set at a maximum level Pf and the tension on the wire 1 set at a moderate level Tf, the parameters of machining pulses may be set at the W-EDM power supply 16 (FIG. 1) to values which allow erosion to proceed at a maximum rate of stock removal in terms of volume per unit time, in consideration of the workpiece and wire materials and their thicknesses, etc. A maximum rate of cutting feed displacement between the straight-line path L and the workpiece 3 is thus permitted and is set at the NC unit 24 (FIG. 1) for the step (a).

In a second step (b) of the method being described, starting with the position B in FIG. 5 that is the end position of step (a), the rate of cutting feed is reduced to Vm which is defined in either constant or average minimum value and substantially lower than the maximum value Vf. Thus, the value Vm may, for example, be nil, meaning that the cutting feed displacement comes to stop in step (b). At the beginning of step (b), the value Vm may be reached either directly or gradually from the value Vf in step (a) and then maintained throughout the remainder of step (b). Alternatively, the cutting feed rate Vf at the beginning of step (b) may be gradually reduced as Vm to come to nil or a minimum velocity level at the end of step (b). In step (b), however, it should be noted that machining pulses must continue to be applied from the power supply 16 (FIG. 1) to the workpiece 3 and the traveling electrode wire 1 to allow continuation of erosive stock removal from the workpiece across the gap G flushed with the liquid medium.

Figure 6:
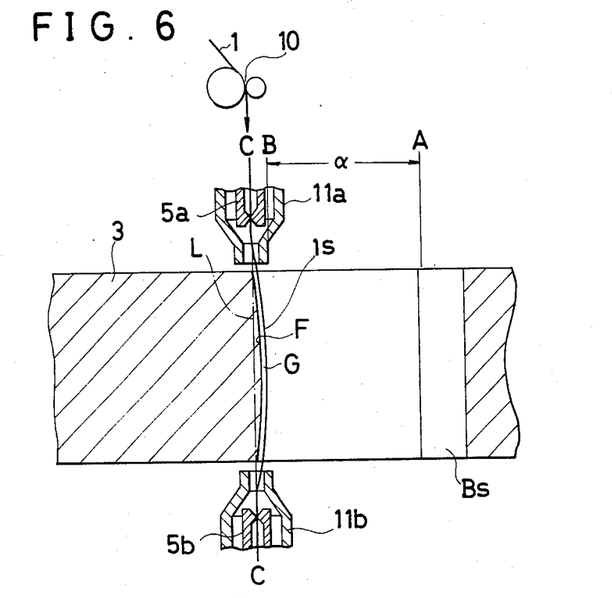

As step (b) proceeds by permitting continued application of machining pulses and effecting the cutting feed at a reduced rate Vm, it has been found that the pressure tending to deflect the traveling wire span 1s decreases so that the rate of erosive stock removal increases continuously towards the mid portion of the cutting front F in the workpiece 3. Thus, the curvature of the convex cut front F becomes gradually reduced and this allows the traveling wire span 1s to be correspondingly less deflected at a position C as shown in FIG. 6. Step (b) is continued for an extent $\beta$, defined again in either distance or time period, until the traveling wire span 1s comes substantially into alignment with the straight line path 1 at a position D and the cut front F becomes substantially straight parallel thereto as shown in FIG. 7.

Figure 7:
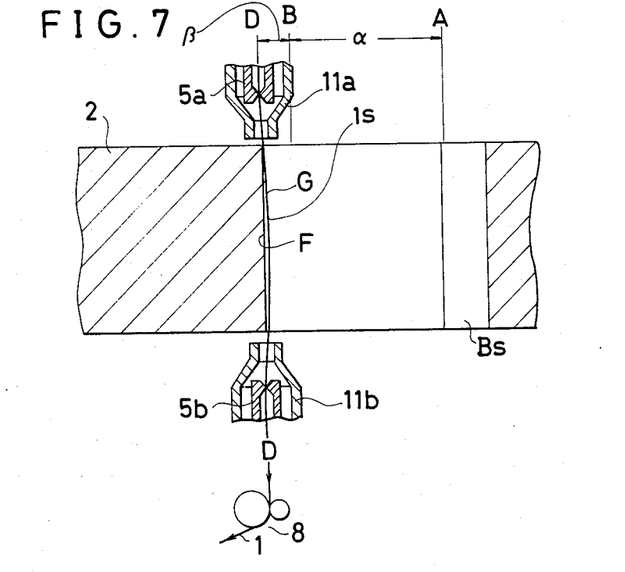
Figure 8:
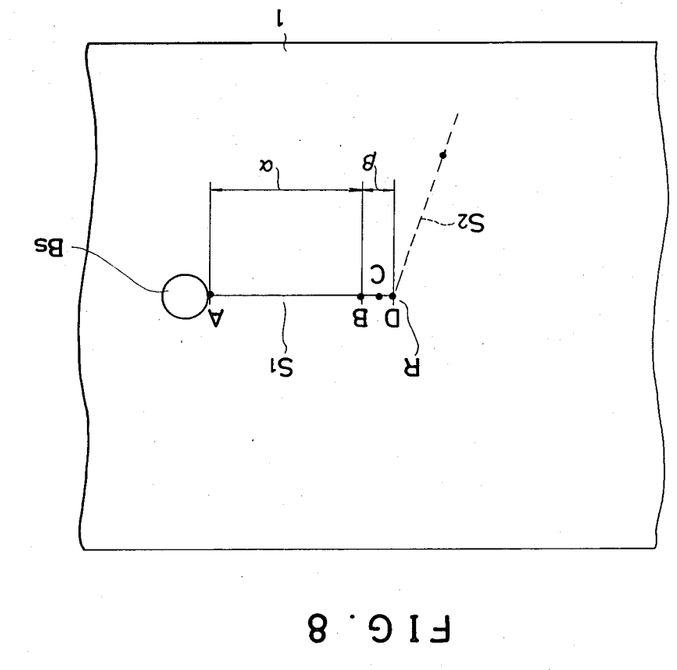
FIG. 8 is a diagrammatic plan view illustrating several positions passed by the electrode wire in the workpiece shown in FIGS. 4–7.

The position D in FIG. 7 corresponds to the position A in FIG. 4. Thus step (a) is to follow step (b) and the cycle is repeated until a final step (b) is completed, e.g. representing arrival of the straight-line path L at the end point of a programmed feed path.

As mentioned previously, the extent $\alpha$ by which step (a) is to continue may be defined either in a distance, i.e. distance D1 from position A to position B, or a time period, i.e. time period T1 it will take to complete a cutting feed displacement over the distance D1. Likewise the extent $\beta$ by which step (b) is to continue may be defined either in a distance, i.e. the distance D2 from position B to position D, or a time period T2 it will take to complete a cutting feed displacement over the distance D2.

Thus, referring back to FIG. 1, a counter 31 is included responsive to clock pulses from the generator 26 which may serve as a timing pulse generator to define a preselected time period T1. When a preset first number n1 of clock pulses defining the time period T1 for step (a) are counted up, the counter 31 issues a first control signal to a control circuit 32. The latter in response to this signal acts on the NC unit 24 to change the cutting feed rate from a first preset value Vf to a second preset value Vm which is lower than Vf while resetting the counter 31 to allow it to re-start counting. The NC unit 24 may be programmed to execute any mode of the changes of the cutting feed rate for or during step (b) as described earlier. Then, when a preset second number n2 of clock pulses defining the time period T2 for step (b) are counted, the counter 31 issues a second control signal to the NC unit 24 via the control circuit 32 to change the cutting feed rate from the value Vm back to the value Vf.

Also shown in FIG. 1 is an alternative timing circuit 33 including an OR gate 33a and a counter 33b which define the distances D1 and D2. The OR gate 33a is responsive to signal pulses derived from the X-axis and Y-axis channel outputs 27 and 28 of the NC unit 24 to enable the counter 33b to count both of these signal pulses each of which represents an incremental distance of cutting feed displacement to be effected by the X-axis drive system 22, 20 and the Y-axis drive system 23, 21. When a first preset number n1 of these signal pulses defining the distance D1 for step (a) is counted up (or down), the counter 33b acts via the control circuit 32 on the NC unit 24 to change the cutting feed rate from the first preset value Vf to the second preset value Vm which is lower than Vf. The counter 33b is reset to re-start counting. Then, when a second preset number n2 of these signal pulses defining the distance D2 for step (b) are counted up (or down) by the counter 33b, the NC unit 24 is enabled by the control circuit 32 to change the cutting feed rate from the value Vm back to the value Vf. The counter 33a is then reset again and the cycle is repeated.

In or for step (b), it is preferable to reduce the rate flow or pressure of the flushing medium towards and into the machining gap and/or to modify the parameters of machining pulses, correspondingly to the reduction of the cutting feed rate so that the rate of electroerosive stock removal in terms of volume per unit time is substantially reduced commensurate with the reduced cutting feed rate Vm. Such an additional change or changes are found to be desirable in order to avoid an increase in the cut slot width in step (b), thus to maintain that width substantially unvaried throughout the repeated steps (a) and (b). It is also found to be desirable to increase the tension on the electrode wire 1 so that the rectification of the bent wire span 1s towards a straight-line stretch is facilitated, thus reducing the time period T2 or distance D2 in which the cutting rate is slowed to minimum.

Thus, the control circuit 32 in FIG. 1 is additionally tied to the W-EDM power supply 16 supplying the machining pulses to the gap G and to the drive circuit 15 for the motor 14 acting on the pump 13. A control signal from the circuit 32 may act on the power supply 16 so as to effect, e.g. an increase of the pulse interval or "off" time off between successvie machining pulses so that the mean current passing through the gap G is substantially reduced to reduce the rate of erosive stock removal for or in step (b). The pulse duration or "on" time Ion and the peak current Ip may remain unchanged to maintain stock removal per signal discharge pulse unvaried. A further control signal may also be produced by the circuit 32 onto the drive control unit 15 to reduce the rate of rotation of the motor 14, thereby reducing the rate of flow or pressure from the higher value Pf to a lower value Pm in step (b). Additionally, the control circuit 32 may, as shown, act on either or both of the drive circuit 36 for the wire driving motor 9 and the controller 37 for the wire braking unit 10 so as to change the tension of the wire 1 from the lower value Tf to a higher value Tm.

The advantages of the method described are particularly noticeable when as is typical one or more arc zones or corners are included in the contour of cut desired. The programmed cutting path shown in FIG. 8 includes a corner R at which two successsive linear paths S1, S2 join with an angle. If a higher cutting feed rate Vf is employed throughout the path portions S1-R-S2, a cutting inaccuracy will occur around the corner R as mentioned previously. On the other hand, the use of a slower cutting rate Vm throughout the path portions S1-R-S2 will make the TW-E operation prohibitively time-consuming. Thus, in one embodiment of the method described, the repetition of steps (a) and (b) are advantageously adjusted so that the end position D of the step (b) falls at the corner R. This advantageously eliminates an inaccuracy as aforesaid while reducing the total cutting time over the path portions S1-R-S2 to minimum, hence greatly enhancing the efficiency of the TW-E operation.

What is claimed is:

1. A method of machining a conductive workpiece in which a flexible, elongate electrode element is axially transported to renew its span stretched under tension between a pair of guide members disposed at opposite sides of the workpiece in a cutting zone supplied with a flushing fluid medium, and electrical machining current is passed between the workpiece and the electrode span traveling through the cutting zone to electroerosively remove stock from the workpiece while a straight-line path established for the traveling electrode span between the guide members is displaced relative to the workpiece along a commanded cutting feed path to form a cut contour corresponding thereto in the workpiece, the method comprising the steps of:

(a) effecting the passage of machining current between the workpiece and the traveling electrode span in the cutting zone while effecting the relative displacement between said straight-line path and the workpiece from a given position along one portion of said cutting feed path, at a first rate of feed and by a first extent such that said traveling electrode span bends backwards beyond a predetermined degree;

(b) continuing the passage of machining current between the workpiece and the traveling electrode span in the cutting zone while effecting the relative displacement between said straight-line path and the workpiece along another portion of said cutting feed path immediately following said one portion at a second rate of feed which is slower than said first rate of feed by a second extent which is less than said first extent such that said bent traveling electrode span comes into substantial alignment with said straight-line path in said cutting zone, at least one of said first and second extents being predetermined in terms of distance or time period; and (c) repeating steps (a) and (b) in sequence while said straight-line path and said workpiece are relatively displaced along said commanded cutting feed path irrespective of the cut contour being formed by the commanded cutting feed path.

2. The method defined in claim 1 wherein said second rate of feed is substantially nil.

3. The method defined in claim 1 wherein said flushing medium is supplied into the cutting zone in step (a) at a first rate of flow and in step (b) at a second rate of flow which is lower than said first rate of flow.

4. The method defined in claim 1 wherein said traveling electrode span is stretched between said guide members in step a) at a first tension and in step (b) at a second tension which is higher than said first tension.

5. The method defined in claim 1, claim 3 or claim 4 wherein said machining current is passed between the workpiece and said traveling electrode in step (a) in a first mean current level and in step (b) in a second mean current level which is lower than said first level.

6. The method defined in claim 5 wherein said machining current is passed in the form of a succession of electrical pulses in both steps (a) and (b) and the pulse interval between successive such pulses is greater in step (b) than in step (a).

7. The method defined in claim 6 wherein at least one of the current level and the duration of each of the successive pulses is substantially the same for both steps (a) and (b).

8. The method defined in claim 1 wherein said feed path includes at least a corner interconnecting two successive substantially rectilinear path portions with an angle and the position of said straight-line path at the end of step (b) falls substantially on said corner.

9. An apparatus for machining a conductive workpiece by means of a flexible, elongate electrode element axially transported to renew its span in a cutting zone, comprising:

a pair of guide members disposed at opposite sides of the workpiece for establishing a straight-line path for the electrode span traveling through the cutting zone;

fluid delivery means for supplying a flushing medium into said cutting zone;

tension means for driving said traveling electode span between said guide members into alignment with said straight-line path;

power supply means for passing machining current between said traveling electrode span and the workpiece across a gap flushed with said medium to electroerosively remove stock from the workpiece;

cutting feed means for relatively displacing said straight-line path and said workpiece along a commanded cutting feed path to form a cut contour corresponding thereto in the workpiece; and control means associated with said feed means for operating said feed means to repeat the steps in succession of: (a) while machining current is passed from said power supply means between the workpiece and said traveling electrode span, effecting the relatively displacement between said straight-line path and the workpiece from a given position along one portion of said cutting feed path at such a first rate of feed and for such a first extent that said traveling span bends backwards beyond a predetermined degree and (b) while machining current continues to be passed from said power supply means between the workpiece and the traveling electrode span, effecting the relative displacement between said straight-line path and the workpiece along another portion of said cutting feed path immediately following said one portion at a second rate of feed, which is lower than said first rate, for a second extent, which is less than said first extent, such that said bent traveling electrode span comes into substantial alignment with said straight-line path, said control means including a timing pulse generator and a counter for together controlling the magnitude of said first and second extents and for making said steps (a) and (b) cyclically repeat as long as said electrode element is being displaced relative to said workpiece along said commanded cutting feed path.

10. The apparatus defined in claim 9 wherein said control means is operable to preset the rate of flow of the flushing medium towards the cutting zone for step (a) at a first value and for step (b) at a second value which is lower than said first value.

11. The apparatus defined in claim 9 when said control means is operable to preset the pressure of the flushing medium discharging from said fluid supply means towards the cutting zone for step (a) at a first level and for step (b) a second level which is lower than said first level.

12. The apparatus defined in claim 9 wherein said control means is operable to set the tension means to establish on said traveling electrode span a first tension for step (a) and a second tension which is higher than said first tension for step (b).

13. The apparatus defined in claim 9, claim 10, claim 11 or claim 14 wherein said control means is also operable to act on said power supply to establish a first mean current level of the machining current for step (a) and a second mean current level of machining current which is lower than said first level for step (b).

* * * * *